United States Patent [19]

Harper

[11] Patent Number: 4,667,138

[45] Date of Patent: May 19, 1987

[54] MULTIPLEXED SYNCHRO DRIVER

[75] Inventor: Robert W. Harper, Marion, Iowa

[73] Assignee: Rockwell International Corporation, El Segundo, Calif.

[21] Appl. No.: 845,219

[22] Filed: Mar. 27, 1986

[51] Int. Cl.$^4$ .............................................. G05B 6/02
[52] U.S. Cl. .................................... 318/654; 318/661; 340/347 SY
[58] Field of Search .............................. 318/654–661, 318/562; 340/347 SY

[56] References Cited

U.S. PATENT DOCUMENTS

| | | | |
|---|---|---|---|
| 3,829,752 | 8/1974 | Martines et al. | 318/654 |
| 4,328,483 | 5/1982 | Swartz et al. | 318/654 |
| 4,467,320 | 8/1984 | McPhee | 340/347 SY |
| 4,518,905 | 5/1985 | Rhodes, Jr. | 318/661 |

Primary Examiner—Benjamin Dobeck
Attorney, Agent, or Firm—George A. Montanye; Robert C. Mayes; H. Fredrick Hamann

[57] ABSTRACT

An improved drive control circuit is disclosed for enabling the multiplexed drive of synchro receivers. A zero crossing detector is coupled to sense the zero crossings of a signal driving the excitation winding of a synchro receiver. A counter coupled to the output of the zero crossing detector responds to one of every n counts to provide a count signal for operating a synchro driver associated with each one of multiple synchro receivers. The count signal causes the synchro driver to provide a signal output to the respective synchro receiver during a period defined by the count signal to reduce average power dissipation and provide effective damping without sacrificing peak current capability.

11 Claims, 4 Drawing Figures

MULTIPLEXED SYNCHRO DRIVER

BACKGROUND OF THE INVENTION

The present invention relates to synchro control and more particularly to multiplexing techniques for synchro drivers (transmitters).

Synchros are well-known in the prior art and are used to drive and control a variery of instruments in response to electrical excitation. By way of example, in many avionic systems synchros are employed to provide shaft rotation for controlling various aircraft instruments for display and control. In such instances, the prior art typically employs a plurality of synchros and servos for various devices in the aircraft. Conventional solid-state synchro drivers designed to control the excitation of the windings of a synchro receiver often have limited applications because of different requirements for providing sufficient drive for heavy mismatched loads and proper damping for light single loads. In many applications requiring both, conventional synchro drivers and designs sacrifice one capability for achieving the other. As a result, the application of synchro systems to a variety of aircraft environments is often very limited.

In addition to the above, in many advanced avionics systems employing synchro controls, there is a continuing need to reduce size, weight and power requirements of the instrument and control systems. Using conventional synchro systems, the power supply and driver are required to have a capacity sufficient to meet all of the power and output requirements regardless of the synchro load. Thus, the driver and power supply are required to handle the average power dissipation regardless of the size of the load. As a result, many synchro driving systems cannot meet the spectrum of loading conditions required in current aircraft without a specific tailoring of the drive circuitry or the aircraft system. In any event, such synchro systems necessarily are constructed to handle the maximum power requirements of the system, thereby resulting in the dissipation of significant power regardless of the number or type of synchros being driven.

In many high technology systems including Tacan, VOR, DME, etc., there is still a need for the use of synchro systems and synchro drives. However, in view of the weight, cost and miniaturization requirements of many of the systems, there is a continuing need to provide less costly, more efficient, and less complex circuitry associated with synchro functions and control. There is therefore a continuing need to provide synchro systems and synchro drives which may be applied in a variety of aircraft and other systems requiring synchro control.

Accordingly, the present invention has been developed to overcome the specific shortcomings of the above-known and similar techniques and to provide an improved synchro system and drive having a variety of applications.

SUMMARY OF THE INVENTION

In accordance with the present invention, a synchro driving system is disclosed for providing multiplexed control of synchro receivers. In one embodiment of the invention, a conventional synchro excitation signal is provided to the excitation windings of a synchro receiver and is also coupled to a zero crossing detector for providing a trigger signal in response to the detected zero crossings of the excitation signal. A counter is coupled to receive the trigger signal and to provide a plurality of outputs presenting a count from one through n. The output from the counter is coupled to a synchro driver which receives an input signal of the same frequency as the excitation signal for driving an associated winding of a synchro receiver. The synchro driver responds to the output of the counter to periodically provide a portion of the input signal as a drive signal for the associated synchro winding. Each winding of the synchro receiver has an associated driver controlled by the same counter output and thus produces a drive signal for a period determined by the count of the counter. An additional detection circuit may be coupled to determine when a servo is connected to the drive outputs to allow sufficient drive for servo only loads while providing duty cycle control for loads including synchro receivers.

It is therefore a feature of the invention to provide an improved synchro system.

It is a further feature of the invention to provide a synchro drive system which reduces average power dissipation.

It is still a further feature of the invention to provide a multiplexed synchro driver which allows reduction in the size of the power supply and driver for a synchro control system.

Yet another feature of the invention is to provide a multiplexed synchro drive which provides effective damping of the driver output without sacrificing peak current capability for proper synchro null.

Yet a further feature of the invention is to provide a multiplexed synchro driving system which can accommodate heavily mismatched loads and still provide effective damping for light signal loads.

A still further feature of the invention is to provide a synchro drive system which can be used to control synchro and servo motors in parallel yet accommodate servo drive alone.

These and other objects, advantages, and novel features of the invention will become apparent from the following detailed description when considered in connection with the accompanying drawings wherein:

DETAILED DESCRIPTION OF A PREFERRED EMBODIMENT

Figure 1:
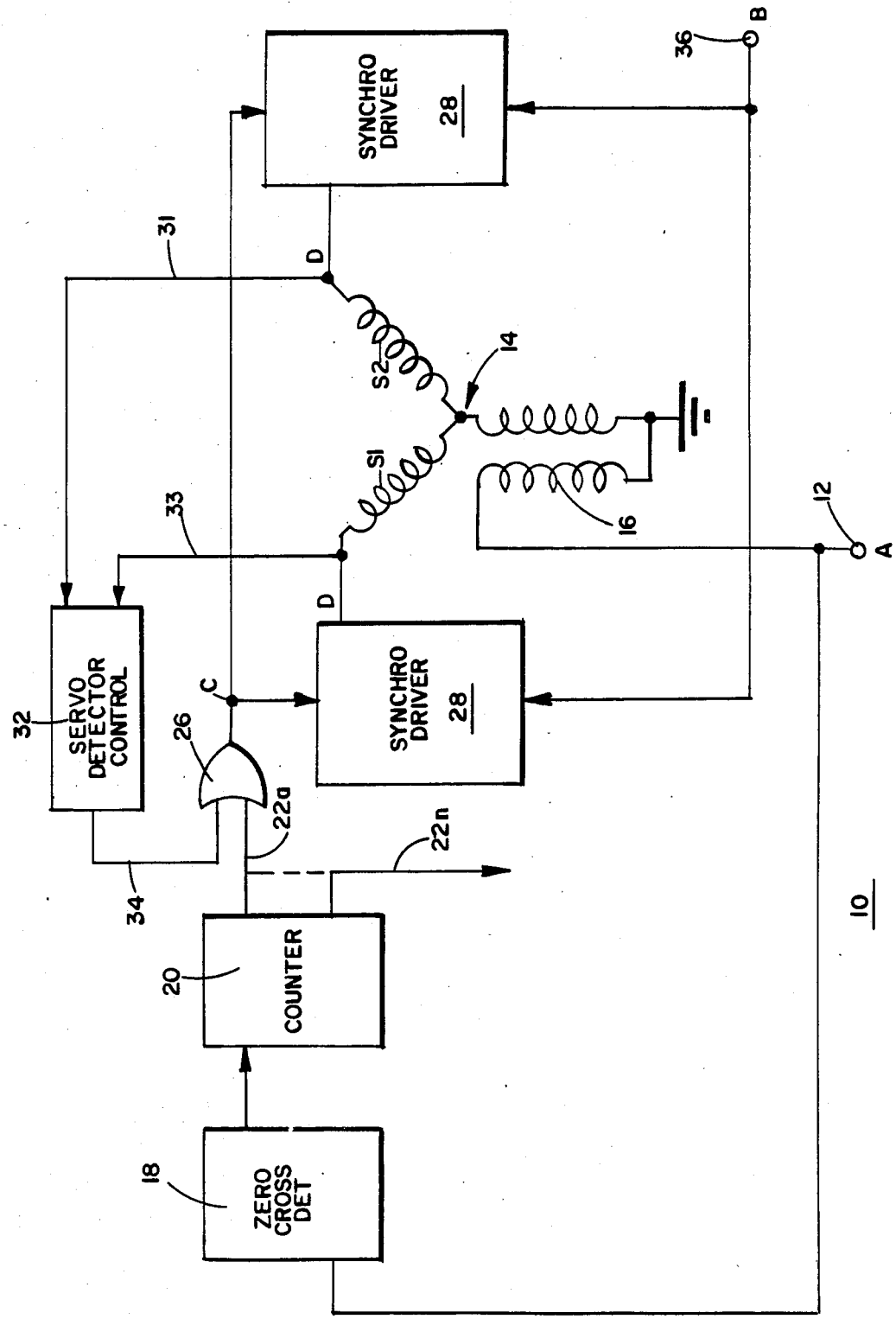
FIG. 1 is a schematic block diagram showing the synchro drive and control system in accordance with the present invention.

Referring now to the drawings, wherein like numerals are used to refer to like elements throughout, there is shown in FIG. 1 a synchro drive and control system in accordance with the present invention. More particularly, the system 10 includes an excitation signal provided to terminal 12 which is used to drive the excitation winding 16 of a synchro receiver 14 having associated synchro coils S1, S2 and S3 coupled in a Y configuration as shown in the drawing. The signal at terminal 10 is also coupled as an input to a conventional zero crossing detector 18 which detects the zero crossings of the excitation signal shown as a conventional 400 Hz synchro driving signal A in FIG. 2.

The output of the zero crossing detector 18 is a pulsed signal which is triggered in response to each zero crossing detection. The pulse or trigger output of zero crossing detector 18 is coupled to a count control input of a conventional counter 20. The counter 20 receives each trigger input from the zero crossing detector 18 and provides an output on associated lines 22a–22n as the counter counts the number of trigger pulses. The counter is constructed to count from 1 to n before repeating the same count in response to continuing trigger signals. As will be understood, the output on line 22a will be a logic "1" in response to the first count and that logic "1" will subsequently move one line to the next of the sequential outputs 22b–22n in response to each next succeeding trigger signal from zero crossing detector 18.

In the embodiment shown in FIG. 1, the first output 22a is shown coupled to an OR gate 26 and each of the other outputs 22b–22n of the counter 20 may be coupled in a similar manner to other drivers in the synchro system if required. Thus, although the remaining portions of the system 10 shown in FIG. 1 are not specifically shown in relation to the outputs 22b–22n, it should be apparent that the same elements depicted in FIG. 1 may be employed for additional synchro drives as are employed with respect to the output 22a.

The output of OR gate 26 provides a signal C as one input to each of the synchro drivers 28 coupled to drive an associated synchro winding S1 and S2 of the synchro receiver 14. The synchro drivers 28 are of identical construction so that the description of the construction and operation of one will suffice with respect to an understanding of the operation and construction of all other synchro drivers that may be used in the described system.

Figure 2:
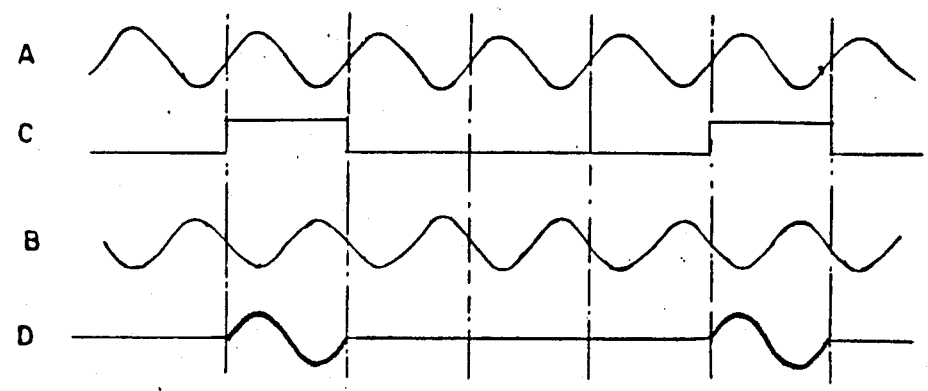
FIG. 2 is a schematic diagram showing the signals at various outputs to the electrical devices depicted in FIG. 1 and their time relation with respect to one another.

The signal C, more particularly depicted in FIG. 2, is a digital signal determined by the presence of a logic 1 on the output 22a of counter 20. In the present system of FIG. 1, the counter 20 is selected as a counter having n equal to 4 such that the logic 1 output on 22a is repeated for every fourth period of the excitation signal A. The synchro drivers 28 receive as a second input, a drive signal B coupled to terminal 36 and depicted in FIG. 2, as a signal of the same frequency as the excitation signal A. The signal B may have a phase difference depending upon the desired position of the synchro in accordance with conventional synchro control construction and techniques. The synchro driver acts as a gate which passes a portion of the drive signal B to the respective and associated windings S1 and S2 of the synchro motor as the drive signal output D. The signal D is shown more particularly as one period of the signal B as determined by the counter output C from 22a. It should be appreciated that although signal B is shown as a single signal coupled from terminal 36 to both drivers 28, in practice, the signal B would be two separate signals applied individually to each driver 28 in a manner conventionally employed in the prior art.

As will be understood from the above description of FIG. 1, the synchro drivers 28 are controlled so that the drive signal B is passed to drive the associated winding S1 or S2 only during a time fixed by the counter 20. As a result, there is no continuous drive of synchro 14 nor of any other synchros attached and driven by other synchro drivers coupled to respond to the outputs 22b–22n of the counter 20. Therefore, the average power dissipation in the synchro driver can be reduced and the capacity of the power supply required to drive the synchros can be reduced by approximately n times. This is due to the multiplexing produced by the cycling of the counter outputs 22a–22n to drive the respective synchro windings on a multiplexed basis. Additionally, the multiplexing produces an effective damping of the driver output for light synchro loads without sacrificing the peak current capability required to properly null a synchro thereby allowing more versatile operation in systems requiring heavy mismatched loads and light single loads. Thus, for light loads, the multiplexed synchro driver denies the average input required to maintain a motoring condition while still being capable of supplying peak nulling current required by heavy mismatched loads.

Figure 3:
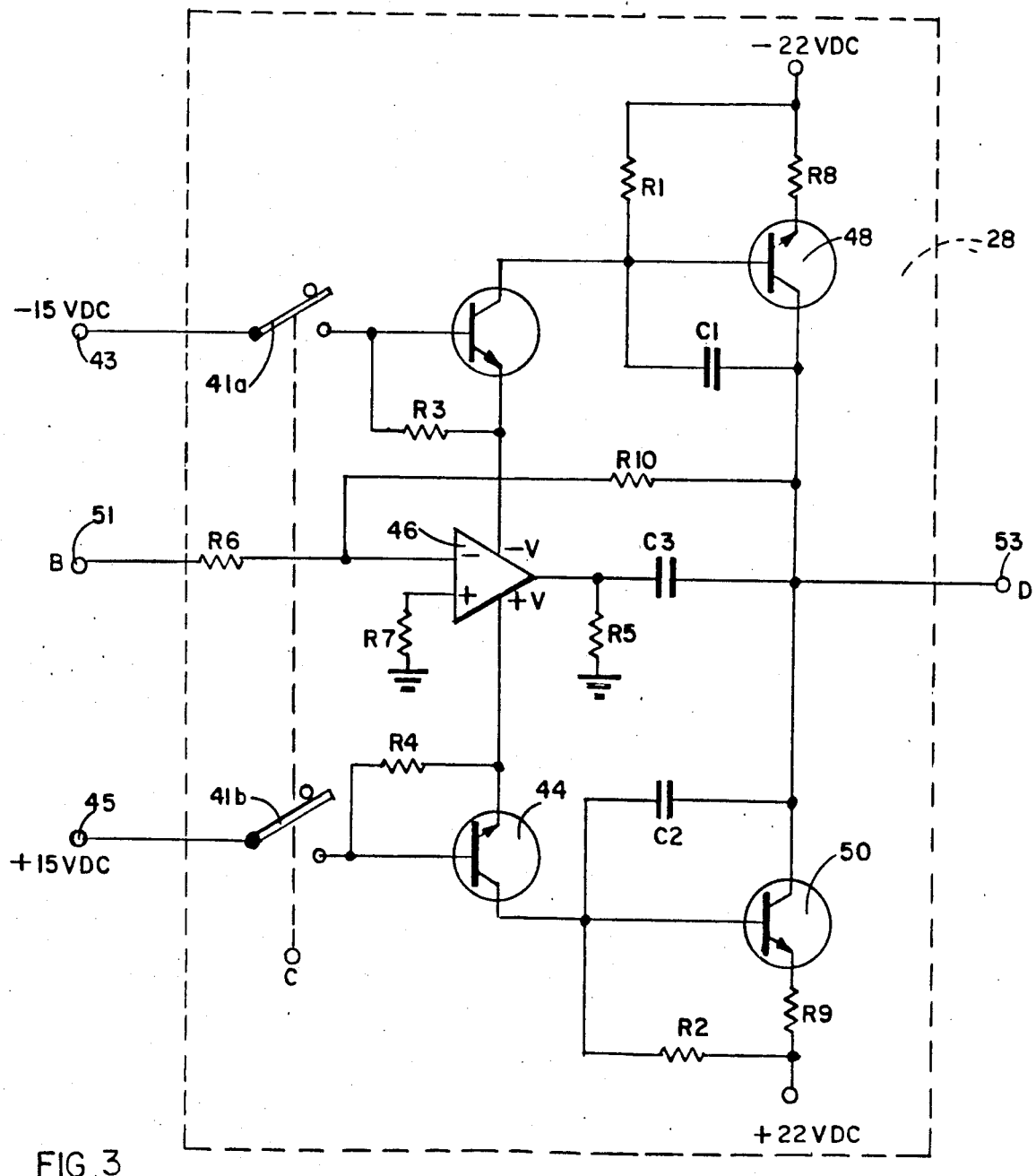
FIG. 3 is a detailed schematic diagram showing the construction of a synchro driver used in the system of FIG. 1.

Referring now to FIG. 3, there is shown one embodiment of a specific solid-state circuit that may be used to implement the driver circuit 28 in FIG. 1. The driver 28 includes a solid-state switch 40 which may be conventionally constructed from a typical semiconductor switch formed by element AD7510. Obviously, although depicted as mechanical contacts 41a and 41b, the switch contacts are actually solid-state switching devices driven to have an open and closed condition in response to the digital logic signal C provided as the output of the counter 20. Thus, solid-state switches 40 are driven by signal C such that upon the occurrence of a logic 1 output (e.g., on line 22a) the contacts 41a and 41b are closed, while during the remaining time period the contacts 41a and 41b remain open.

The switch contacts 41a and 41b respectively, couple negative 15 volt DC and positive 15 volt DC voltages from terminals 43 and 45, respectively, to the base of associated transistors 42 and 44. Transistor 42 is a 2N2907A having its emitter terminal coupled to the negative V input of a conventional 741 operational amplifier 46. Transistor 44 is a 2N2222A having its emitter coupled to the plus V input of the operational amplifier 46. Each transistor 42, 44 has a 150 ohm resistor R3, R4 coupled between the base and emitter of its associated transistor. The collector of transistor 42 is coupled to the base of transistor 48 while the collector of transistor 44 is coupled to the base of transistor 50. The transistors 48 and 50 have capacitors C1 and C2 of 0.01 microfarads coupled between the collector and base of the associated transistor and each emitter of the transistors 48 and 50 has a series resistance R8, R9 respectively, coupled between a negative 22 volt DC source and a positive 22 volt DC source in the manner shown in FIG. 3. Also, 3.3K ohm resistors R1 and R2 are coupled between the associated 22 volt DC voltage and the base of the corresponding transistor 48 and 50.

The input to the circuit 28 is provided at terminal 51 as signal B and is coupled through a 10K ohm resistor R6 as an input to the inverting input of operational amplifier 46. The noninverting input to the same operational amplifier 46 is coupled through a 6.8 ohm resistor R7 to ground. The output of operational amplifier 46 is coupled to one terminal of a 470 ohm resistor R5 having its second terminal coupled to ground and also to one terminal of a 0.1 mircrofarad capacitor C3 having a second terminal coupled to the collectors of both the transistors 48 and 50 to provide the signal D on output terminal 53. A 20 K ohm resistor R10 is coupled between the inverting input to the operational amplifier 46 and the commonly coupled collectors of the transistors 48 and 50.

The operation of the above circuit may be easily understood by reference to the same FIG. 3. In this regard, the signal C from the counter 20 provides a logic switch control which switches the plus and minus 15 volt DC supply through the respective switch contacts 41a and 41b for one of every n cycles of the 400 Hz input excitation signal as shown in FIG. 2. When the switches represented by the contacts 41a and 41b are open, the source of emitter-base current for the transistors 42 and 44 is interrupted which acts to maintain transistors 48 and 50 in an off condition so that the transistors 48 and 50 are essentially an open circuit and the output 53 represents an open circuit. The open circuit is represented by relatively high impedance of approximately 4K ohms relative to the low impedance of the instrument being driven (synchro 14 )to which the synchro driver 28 is attached. Accordingly, the high impedance output at 53 looks like an open circuit for driving purposes.

When the logic 1 count signal C appears on line 22a in FIG. 1, the switches represented by contacts 41a and 41b are closed to provide quiescent supply current to the operational amplifier 46 through resistors R3 and R4 with a voltage drop sufficiently low that transistors 42 and 44 remain off with a zero volt input into R6. However, when the input to R6 goes positive in response to the signal input B at terminal 51, the operational amplifier 46 demands more negative supply current through resistor R3 in an attempt to force the output to a negative value approximately twice the value of the input. This action causes the voltage drop across R3 to rise enough to turn on the transistor 42 which in turn turns on transistor 48 to supply the desired output current required to bring the output voltage at the collector of 48 to a negative value approximately two times the input.

Consequently, when the input to terminal 51 becomes negative due to the tracking of signal B, the process described above with respect to transistors 42 and 48 is identical for transistors 44 and 50 on the opposite side of the amplifier 46. In both instances, R8 and R9 provide current limitations for the amplifier 46. The net result of this operation is that the output of 53 is a signal D representing a period of the input signal B at terminal 51 determined by the counter signal C for the time period that the switches represented by contacts 41a and 41b remain closed.

In testing the above-identified device, including the circuit 28, it has been discovered that for heavy mismatched load situations (those situations wherein up to 14 synchro loads are employed with a delta phase of 6° and a K-factor mismatch of 10%) and for very light loads prone to motoring, an accuracy of better than ±1° can be maintained with no motoring for a value of $4 \leq n \leq 6$. This allows multiple synchro receivers 14 to be multiplexed using the outputs 22a-22n, the drivers 28 to maintain average power dissipation at a lower value and to cause effective damping for variable loads while still maintaining the capability of supplying the peak nulling current required for heavy mismatched loads.

In many systems employing synchro drive and control, it is often necessary to also employ servo loads alone or in parallel with the synchro receivers. When a synchro receiver is used in parallel with a servo load, the driving system of FIG. 1 is capable of properly driving a servo load at desired tracking rates for satisfactory performance in the instrument or control system. However, if a servo load is driven alone, the multiplexed driver will not satisfactorily drive the servo load at the desired tracking rates. Accordingly, in order to ensure the capability to provide the improved operation using the synchro driver system shown in FIG. 1 with systems where a servo load may be driven alone, a dummy synchro load could be connected to the outputs so that the driver multiplexing could be used. However, the same capability to employ the synchro drive system of FIG. 1 may be achieved using a servo detector control 32, more particularly shown in FIG. 4.

Figure 4:
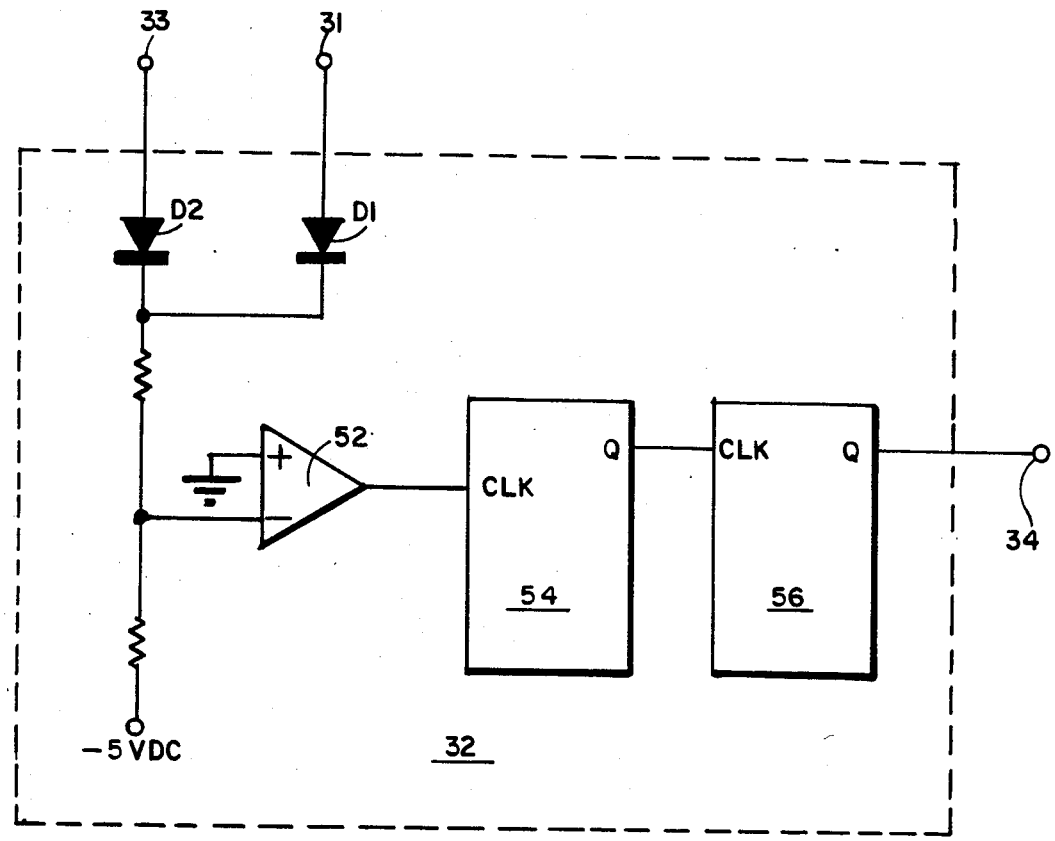
FIG. 4 is a detailed schematic diagram showing a particular detection circuit which may be employed in the system of FIG. 1 to detect servo only control.

Referring now to FIG. 4, servo detector control 32 includes inputs 31 and 33 which are coupled to the outputs of both synchro drivers 28 providing signal D to the respective windings S1 and S2. The terminals 31 and 33 are coupled to the anodes of diodes D1 and D2 having their cathodes coupled in common to one terminal of a 100K ohm resistor having its second terminal coupled to the negative input of an LM139 comparator 52. A second 100K ohm resistor has one terminal coupled to the same negative input of the amplifier 52 and its other terminal coupled to a negative 5 volt DC supply voltage. The positive input of the amplifier 52 is coupled to ground. The output of amplifier 52 is coupled to a 3.5 ms one-shot device 54 formed from a conventional component LS123. The Q output of device 54 is coupled to the clocking input of a 100 ms one-shot device 56 also formed from the conventional component LS123. The Q output of the one-shot device 56 forms the output 34 of the servo control 32 which, as shown in FIG. 1, is coupled as the second input to the OR-gate 26.

In the operation of the circuit of FIG. 1, the servo detector control 32 monitors the output signal on the synchro coils S1 and S2 between the drive cycles to determine when the signal on the output goes to zero for more than 3.5 ms. A zero output detected by lines 31 and 33 indicates that a servo only load is coupled to the drive system. This is determined by detecting when the peaks of the signals provided to S1 and S2 simultaneously fall below approximately 5 volts for more than 3.5 ms. At that time, the servo control 32 provides full drive by causing a logic 1 output for a period of 100 ms through one-shot element 56. After that 100 ms period, the outputs to S1 and S2 are again detected through lines 31 and 33 of servo detector control 32 to again monitor the loads. If it is still a servo only drive, the one-shot 56 continues to drive the windings S1 and S2 in the same manner. This activity provides sufficient drive for servo only loads and also detects when a synchro is switched into the circuit so that the duty cycle output D can be initiated.

With specific reference to FIG. 4, as long as the synchro load 14 is coupled to the output of synchro drivers 28, the output from lines 31 and 33 will produce a voltage in excess of 5 volts at the input to the amplifier 52 at least once every 2.5 ms. This will maintain a trigger signal at the input of 52 through diodes D1 and D2 which will cause one-shot 54 to keep retriggering and therefore never trigger element 56. This causes the output Q of element 56 to remain low which allows a normal duty cycle control by signal C as the input to synchro drivers 28 for the operation as previously described.

In the event that a servo is connected alone to the outputs of a synchro driver 28, there will be zero volts during the driver dead time which will cause the Q output of element 54 to go low for a time sufficient to trigger the 100 ms one-shot 56 and thereby provide a high signal output at 34 for providing full drive output to the servo. At the end of each 100 ms drive time, the detection through lines 31 and 33 will repeat and will provide the recurrent 100 ms output for as long as the servo is connected to the output of the synchro drivers 28 alone. Thereafter, if synchros are provided in parallel with the servo, the normal drive by the control signal C from the counter 20 will be reinstated due to the operation of the one-shot 54 as previously described.

In accordance with the above description, the present invention provides an improved synchro drive and control system which allows more efficient operation of instruments and systems employing synchro and servo control. In particular, the described multiplexed system allows a reduction in the total power required for driving various synchro motors and reduces the power dissipation and thereby the cost and size of many components employed in such systems. Furthermore, the system provides versatility for allowing the drive of heavy mismatched loads while still accommodating and providing effective damping for light loads. These features allow the system to be used to control a variety of instruments in current aircraft systems and any other systems employing such synchro and servo control. The resulting savings in cost, complexity, size and weight allow the more effective use of synchro control with the advanced technology. All of these are features which are not shown or suggested by any of the prior art.

Although the invention has been described with reference to the specific implementations described in FIGS. 1-4, it will be apparent that other particular circuits could be employed to produce the same operation and control features in light of the detailed description. Obviously, there are many other variations and modifications of the invention which are possible in light of the above teachings. It is therefore to be understood that within the scope of the appended claims, the invention may be practiced otherwise then as specifically described.

I claim:

1. A synchro drive system comprising:
   at least one synchro receiver having an excitation winding and a plurality of drive windings;
   means for providing an excitation signal of a given frequency to said excitation winding;
   means for providing a synchro drive signal having the same frequency as said given frequency; and
   means responsive to said excitation signal for intermittently coupling a portion of said synchro drive signal to at least one of said synchro drive windings.

2. The system of claim 1 wherein said at least one synchro receiver is a plurality of synchro receivers.

3. The system of claim 1 wherein said means responsive to said excitation signal comprises:
   means for detecting zero crossings of said excitation signal and providing a trigger signal output for each zero crossing;
   counter means responsive to each trigger signal for counting said trigger signals and providing a plurality of counter outputs, each providing a count signal output in response to a predetermined number of counts of said trigger signals; and
   at least one synchro driver coupled to one of said plurality of counter outputs for coupling said portion of said synchro drive signal as a synchro drive output to said at least one synchro drive winding in response to a count signal output.

4. The system of claim 3 wherein said at least one synchro driver is a plurality of synchro drivers, each coupled to receive the same count signal output to provide said portion of said synchro drive signal to a different one of said plurality of synchro drive windings.

5. The system of claim 3 wherein said counter means is a digital counter having N counter outputs on which said count signal output cyclically occurs for each N count as said counter counts from 1 to N.

6. The system of claim 3 wherein said at least one synchro receiver includes a plurality of synchro receivers, and wherein said at least one synchro driver includes a plurality of synchro drivers, each coupled to a different counter output of said plurality of counter outputs for coupling a portion of a synchro drive signal to at least one drive winding of a different one of said plurality of synchro receivers.

7. The system of claim 4 further including:
   means coupled to said multiple drive windings for detecting a predetermined voltage level of said synchro drive output and providing a detection signal; and
   means responsive to said detection signal for providing an override signal to cause said syncho drivers to couple said synchro drive signal to said synchro drive windings upon the occurrence of said detection signal, and for causing said synchro drivers to provide said portion of said synchro drive signal to said synchro drive windings during the presence of said count signal output.

8. The system of claim 7 wherein said means responsive to said detection signal is an OR-gate coupled to receive said detection signal and said count signal output.

9. The system of claim 7 wherein said means for detecting comprises:
   first and second diodes each having an anode coupled to a different one of said synchro drive windings to detect said predetermined voltage level and a cathode coupled in common through a first impedance to a node point which is also coupled through a second impedance to a voltage reference source;
   an operational amplifier having an inverting input coupled to said node point and a non-inverting input coupled to ground, and an output;
   a first one-shot device having a clock input coupled to the output of said operational amplifer and an output which provides a first one-shot signal for a first predetermined period of time in response to a signal at said clock input; and
   a second one-shot device having a clock input coupled to the output of the first one-shot device for providing a second one-shot signal for a second predetermined period of time in response to said first one-shot signal at the clock input of said second one-shot device.

10. The system of claim 9 wherein said first one-shot device is a 3.5 ms device, and said second one-shot device is a 100 ms one-shot device.

11. In an instrument system employing synchro receiver and parallel coupled servo loads for instrument control, the improvement comprising:
   at least one servo load coupled for intrument control;
   at least one synchro receiver having an excitation winding and a plurality of drive windings and coupled in parallel with said at least one servo load;
   means for providing an excitation signal of a given frequency to said excitation winding;
   means for providing a synchro drive signal having the same frequency as said given frequency;
   means responsive to said excitation signal for intermittently coupling a portion of said synchro drive signal to at least one of said synchro drive windings; and
   means responsive to signals on said synchro drive windings representing a servo load only for providing a drive signal capable of driving said at least one servo load alone.

* * * * *